(12) United States Patent
Lee

(10) Patent No.: US 10,605,471 B2
(45) Date of Patent: Mar. 31, 2020

(54) INTEGRATED BASEMENT VENTILATION APPARATUS

(71) Applicant: VENTILATION INSTITUTE OF KOREA CO., LTD., Seoul (KR)

(72) Inventor: Su-Bin Lee, Seoul (KR)

(73) Assignee: VENTILATION INSTITUTE OF KOREA CO., LTD., Seoul (KR)

(*) Notice: Subject to any disclaimer, the term of this patent is extended or adjusted under 35 U.S.C. 154(b) by 937 days.

(21) Appl. No.: 14/787,459

(22) PCT Filed: May 8, 2014

(86) PCT No.: PCT/KR2014/004076
§ 371 (c)(1),
(2) Date: Nov. 10, 2015

(87) PCT Pub. No.: WO2014/182079
PCT Pub. Date: Nov. 13, 2014

(65) Prior Publication Data
US 2016/0084513 A1    Mar. 24, 2016

(30) Foreign Application Priority Data

May 10, 2013  (KR) .................. 10-2013-0053161

(51) Int. Cl.
  *F24F 11/00* (2018.01)
  *A62C 35/68* (2006.01)
  (Continued)

(52) U.S. Cl.
  CPC .......... *F24F 11/0001* (2013.01); *A62C 2/242* (2013.01); *A62C 35/68* (2013.01);
  (Continued)

(58) Field of Classification Search
  CPC ........ F24F 11/0001; F24F 11/33; F24F 11/89; F24F 7/065; F24F 7/10; F24F 7/08;
  (Continued)

(56) References Cited

U.S. PATENT DOCUMENTS 4,911,065 A * 3/1990 Van Becelaere ....... A62C 2/247
                                                        454/369
5,020,423 A * 6/1991 Hill ..................... F24F 13/1426
                                                        454/319

FOREIGN PATENT DOCUMENTS

CN      105546728 A  *  5/2016
KR      10-0827857 B1    5/2008
(Continued)

*Primary Examiner* — Steven S Anderson, II
(74) *Attorney, Agent, or Firm* — Paratus Law Group, PLLC

(57) ABSTRACT

The present invention relates to an integrated basement ventilation apparatus, and more particularly, to an integrated basement ventilation apparatus which can improve a basement ventilation apparatus and thereby perform an adiabatic cooling using latent heat when air is supplied, and in a case of outbreak of fire, forcibly close a damper closed or opened by itself as air is exhausted, and allow general automatic control depending on a local air condition in a basement structure and which can control an increase in temperature in the basement structure at a low cost and enhance a fire safety, and in particular, can suppress the fire early and significantly enhance the quality of air in the basement structure, thereby significantly enhancing condition and maintenance of whole facilities.

8 Claims, 8 Drawing Sheets

(51) Int. Cl.
    *F24F 6/12*     (2006.01)
    *A62C 2/24*     (2006.01)
    *F24F 7/08*     (2006.01)
    *F24F 7/10*     (2006.01)
    *F04D 25/16*     (2006.01)
    *F04D 25/10*     (2006.01)
    *F04D 25/14*     (2006.01)
    *F24F 7/06*     (2006.01)
    *F04D 29/70*     (2006.01)
    *F24F 11/89*     (2018.01)
    *F24F 7/00*     (2006.01)
    *F24F 3/16*     (2006.01)
    *A62C 2/12*     (2006.01)
    *F24F 11/33*     (2018.01)

(52) U.S. Cl.
    CPC ........... *F04D 25/105* (2013.01); *F04D 25/14* (2013.01); *F04D 25/166* (2013.01); *F04D 29/705* (2013.01); *F24F 6/12* (2013.01); *F24F 7/065* (2013.01); *F24F 7/08* (2013.01); *F24F 7/10* (2013.01); *F24F 11/89* (2018.01); *A62C 2/12* (2013.01); *F24F 11/33* (2018.01); *F24F 2003/1657* (2013.01); *F24F 2007/001* (2013.01); *Y02B 30/542* (2013.01)

(58) Field of Classification Search
    CPC ................... F24F 2007/001; F24F 6/12; F24F 2003/1657; F04D 25/105; F04D 25/14; F04D 25/166; F04D 29/705; A62C 2/242; A62C 2/12; A62C 35/68; Y02B 30/542
    See application file for complete search history.

(56) References Cited

FOREIGN PATENT DOCUMENTS

| | | | |
|---|---|---|---|
| KR | 100827857 B1 | * | 5/2008 |
| KR | 10-2009-0048826 | | 5/2009 |
| KR | 2010050239 | * | 5/2010 |
| KR | 10-1164639 B1 | | 7/2012 |
| KR | 10-1202892 B1 | | 11/2012 |
| KR | 101202892 | * | 11/2012 |

\* cited by examiner (a)

(b)

(a)

(b)

(a)

(b)

(a)

(b)

(c)

(a)  (b)

INTEGRATED BASEMENT VENTILATION APPARATUS

TECHNICAL FIELD

The present invention relates to an integrated basement ventilation apparatus, and more particularly, to an integrated basement ventilation apparatus which can improve a basement ventilation apparatus and thereby perform an adiabatic cooling using latent heat when air is supplied, and in a case of outbreak of fire, forcibly close a damper closed or opened by itself as air is exhausted, and allow general automatic control depending on a local air condition in a basement structure and which can control an increase in temperature in the basement structure at a low cost and enhance a fire safety, and in particular, can suppress the fire early and significantly enhance the quality of air in the basement structure, thereby significantly enhancing condition and maintenance of whole facilities.

BACKGROUND ART

In general, a basement structure of a high-rise apartment or high-rise building is commonly provided with a parking lot. However, in such a basement structure, air is difficult to be circulated by natural ventilation and exhaust gas of a vehicle and another remaining gas are always present, and therefore, the air is circulated by a forced ventilation.

FIG. 1 is a sectional view illustrating a conventional basement ventilation apparatus. As illustrated in FIG. 1, in the conventional basement ventilation apparatus, air supply fans (11) are provided in an air supply shaft (10) vertically formed in a basement structure (1) to supply external fresh air and air exhaust fans (21) are provided in an air exhaust shaft (20) vertically formed in the basement structure to exhaust polluted interior air.

In addition, a plurality of connecting fans (30) are provided in an internal space of the basement structure (1) to form air flow paths from the air supply fans (11) to the air exhaust fans (21), and guiding fans (40) are provided in the air exhaust shaft (20) to guide the exhausted air upwards.

According to such a configuration, in the conventional basement ventilation apparatus, the air supply fans (11) operate to forcibly supply air to the basement structure (1) through the air supply shaft (10), and the polluted air in the basement structure (1) is passed to the air exhaust fans (21) by means of the connecting fans (30), and thereafter, the air exhaust fans (21) operate to forcibly exhaust the polluted air through the air exhaust shaft (20).

At this point, the guiding fans (40) operate to allow the air to be smoothly exhausted through the air exhaust shaft (20) without backflow.

However, the conventional basement ventilation apparatus requires separate cooling, thereby consuming much electrical power for cooling, due to the increase of internal temperature resulting from the fact that external air of high temperature is supplied as it is to the basement structure (1) in a high-temperature area or in the summer. Furthermore, a risk of big fire is always present since high-temperature air easily spreads to another floor through the air exhaust shaft (20) when fire breaks out in the basement structure (1).

In particular, the whole operation of the air supply fans (11), air exhaust fans (21) and connecting fans (30) in the conventional basement ventilation apparatus is simply controlled in an "on/of" manner. Thus, a local ventilation is not possible in a large basement structure (1) and all of the fans are operated for ventilation, which results in a problem of prior art that an operation cost is very high.

SUMMARY OF THE INVENTION

Technical Problems

The present invention has been made in order to solve the above-mentioned problems, and its object is to provide an integrated basement ventilation apparatus which improves a basement ventilation apparatus and thereby performs an adiabatic cooling using latent heat when air is supplied, therefore, can control an increase in temperature in the basement structure at a low cost, and in a case of outbreak of fire, forcibly closes a damper closed or opened by itself as air is exhausted, and thus prevents the spread of fire to another floor, thereby enhancing a fire safety, and in particular, allows general automatic control depending on a local air condition in a basement structure, so can suppress the fire early and also significantly enhance the quality of air in the basement structure, thereby significantly enhancing condition and maintenance of whole facilities.

Solution to the Problem

The above-mentioned object of the present invention is achieved by an integrated basement ventilation apparatus comprising: an air supply fan installed in an air supply inlet of each floor along an air supply shaft of the basement structure; an air exhaust fan installed in an air exhaust outlet in each floor while facing an air exhaust shaft of the basement structure; a plurality of connecting fans supported on a ceiling of each floor of the basement structure to form a plurality of air flow paths from the air supply fan to the air exhaust fan; and a controller receiving electrical signals from the sensors evenly distributed in the ceiling of each floor of the basement structure for generally controlling the air supply fan, the air exhaust fan and the plurality of connecting fans.

In this connection, it is preferable that the air supply fan and the air exhaust fan include a cylindrical fan supported in a polygonal column-shaped frame.

In addition, it is preferable that at least one of the air supply fan and the air exhaust fan is additionally provided with a fire-fighting damper which is opened or closed depending on whether the fan operates or not and which can be forcedly closed through a temperature-dependently operated fuse.

Further, it is preferable that at least one of the air supply fan and the air exhaust fan is additionally provided with spray nozzles which suck in water by means of negative pressure generated due to the air blowing to finely spray the water.

In this connection, it is preferable that the sensors detect at least one of a temperature, humidity, concentration of harmful gas and amount of fine dust and that the controller keeps the temperature, humidity, concentration of harmful gas and amount of fine dust in the basement structure below a set reference value.

Further, advantageously, the connecting fans are supported on the ceiling of the basement structure through aim angle-adjusting means controllable with respect to two or more axes.

In this connection, a plurality of the spray nozzles may be provided radially equidistantly spaced from each other along a periphery of a discharge port of the cylindrical fan, and a water supply pipe may be connected to each spray nozzle, and a plurality of the spray nozzles may be provided in a filtering net consisting of a plurality of concentric circle-shaped pipes and cross-shaped pipes, and a water supply pipe is connected to each spray nozzle.

In addition, advantageously, the air supply fan is additionally provided with anion generators, and supplied air is mixed with anions.

In particular, it is most preferable that the fire-fighting damper comprises a plurality of blades horizontally arranged in multiple stages, each of which has opposite rotation shafts penetrating the frame and rotatably supported thereby and is provided with a weight; a connecting link which integrally connects link arms each fixed to one side of corresponding one of a plurality of the rotation shafts and keeps degrees of opening of the plurality of blades the same; a lock plate which is rotatably supported on other side of any one of a plurality of the rotation shafts and has a catch hook formed at one side of the lock plate and an angle control ring of ring shape formed over a predetermined circumferential section; a catch element which is fixed to an end of the rotation shaft supporting the lock plate and is rotated integrally with the shaft and which protrudes in a normal direction, corresponding to the angle control ring; a fuse which engages the catch hook of the lock plate to restrain the rotation of the lock plate while remaining in a solid state below a predetermined temperature and which is molten to allow the rotation of the lock plate when the predetermined temperature is exceeded; and elastic elements for resiliently rotating the lock plate.

Finally, advantageously, the blades are bent at an end portion opposite to the weight and thus deflect a horizontal flow of air upwards, and the blades are gradually longer as they are disposed closer to a bottom of the frame.

Effects of the Invention

The present invention as described above improves a basement ventilation apparatus and thereby performs an adiabatic cooling using latent heat when air is supplied, therefore, can control an increase in temperature in the basement structure at a low cost, and in a case of outbreak of fire, forcibly closes a damper closed or opened by itself as air is exhausted, and thus prevents the spread of fire to another floor, thereby enhancing a fire safety, and in particular, allows general automatic control depending on a local air condition in a basement structure, so can suppress the fire early and also significantly enhance the quality of air in the basement structure, thereby significantly enhancing condition and maintenance of whole facilities.

Figure 1:
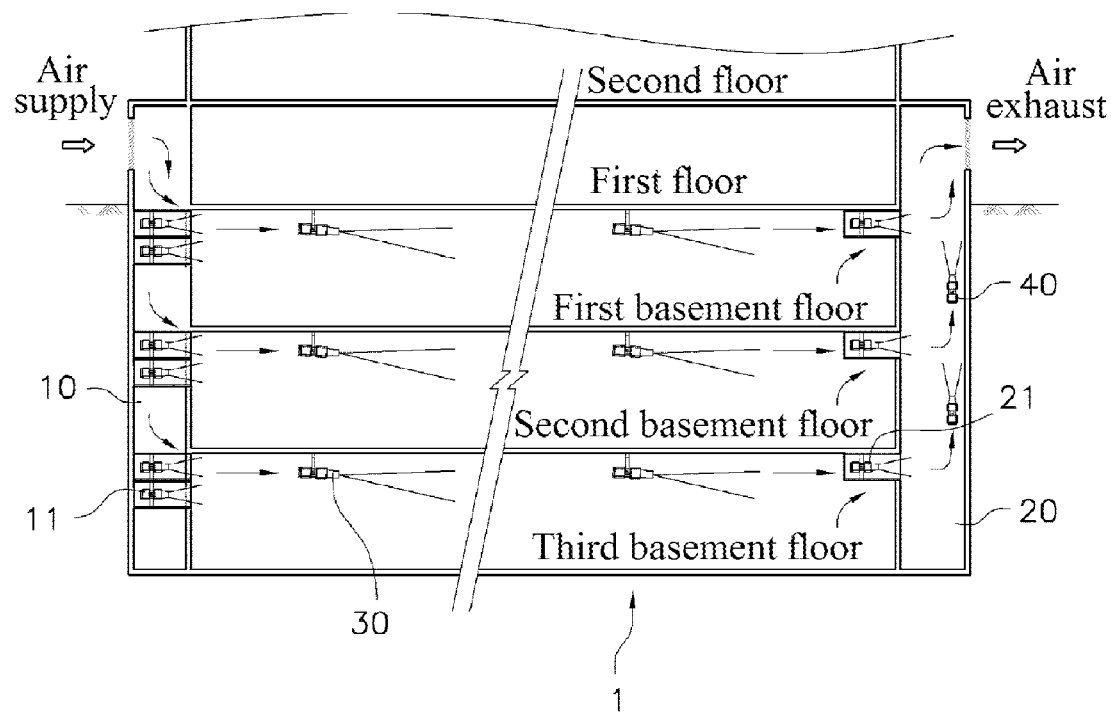
FIG. 1 is a sectional view illustrating a conventional basement ventilation apparatus.

| Description of reference numerals | |
|---|---|
| 1: basement structure | 10: air supply shaft |
| 20: air exhaust shaft | 100: air supply fan |
| 110: spray nozzle | 120: frame |
| 130: cylindrical fan | 131: discharge port |
| 140: anion generator | 200: air exhaust fan |
| 210: fire-fighting damper | 220: frame |
| 211: blade | 211a, 211b: rotation shaft |
| 211c: weight | 212: connecting link |
| 212a: link arm | 213: lock plate |
| 213a: catch hook | 213b: angle control ring |
| 214: catch element | 215: fuse |
| 215a: fuse end | 216: elastic element |
| 300: connecting fan | 310: aim angle-adjusting means |
| 410: sensor | 500: guiding fan |

BEST MODES FOR CARRYING OUT THE INVENTION

Figure 2:
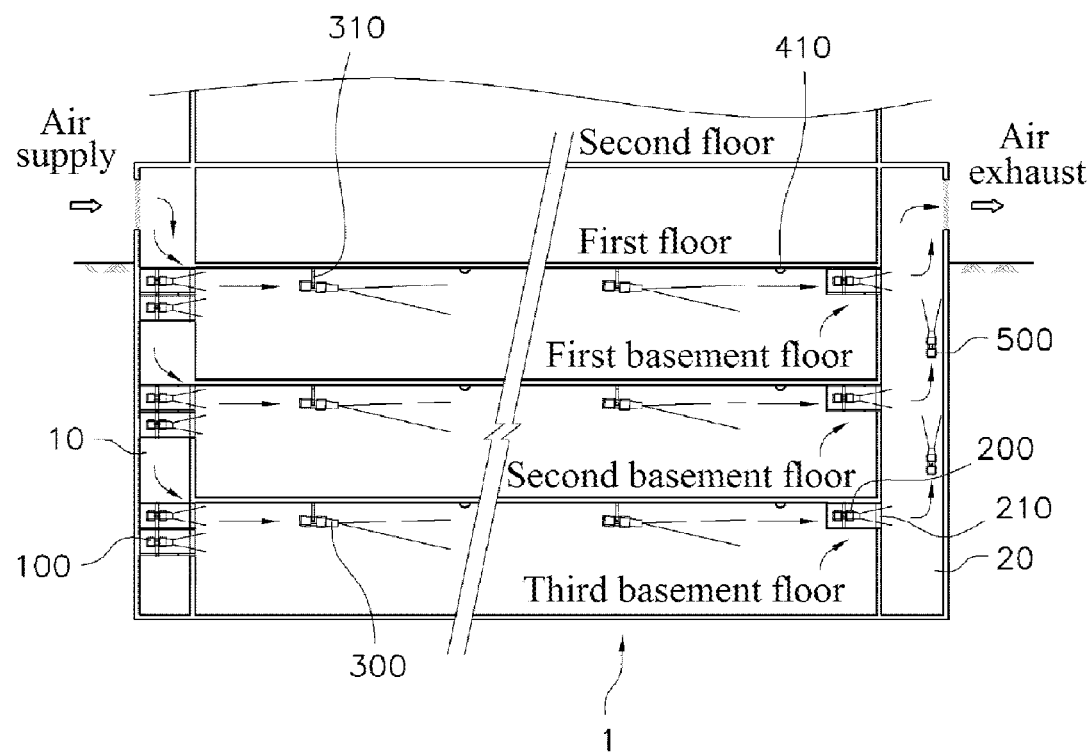
FIG. 2 is a sectional view illustrating an integrated basement ventilation apparatus of the present invention.
Figure 3:
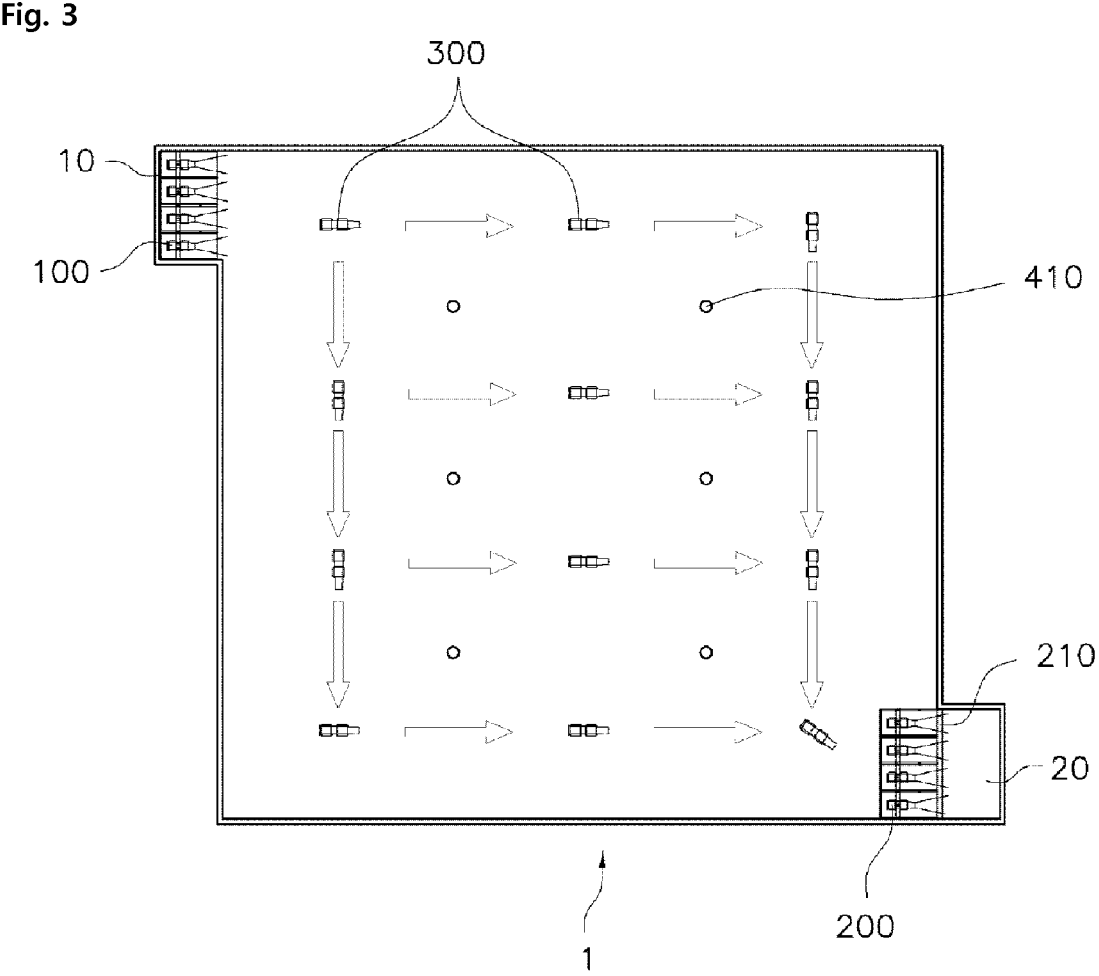
FIG. 3 is a plane view illustrating the integrated basement ventilation apparatus of the present invention.

FIG. 2 is a sectional view illustrating an integrated basement ventilation apparatus of the present invention, and FIG. 3 is a plane view illustrating the integrated basement ventilation apparatus of the present invention.

Figure 4:
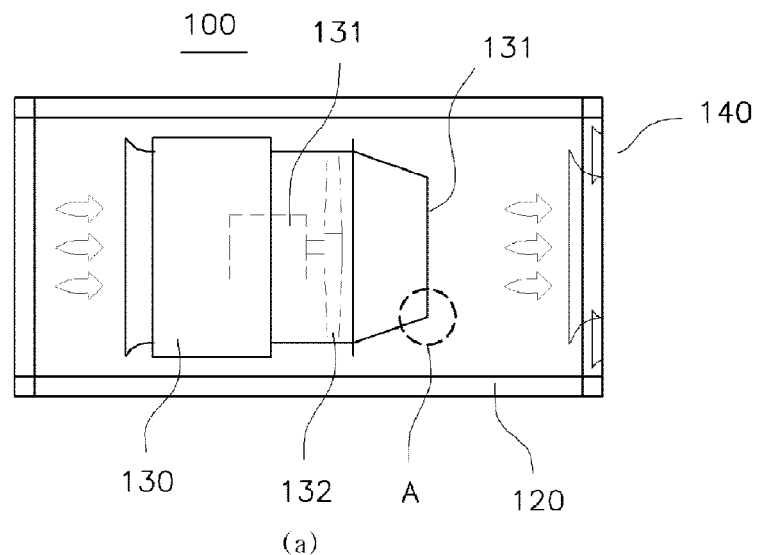
FIG. 4 is a view illustrating an air supply fan in the integrated basement ventilation apparatus of the present invention.
Figure 4:
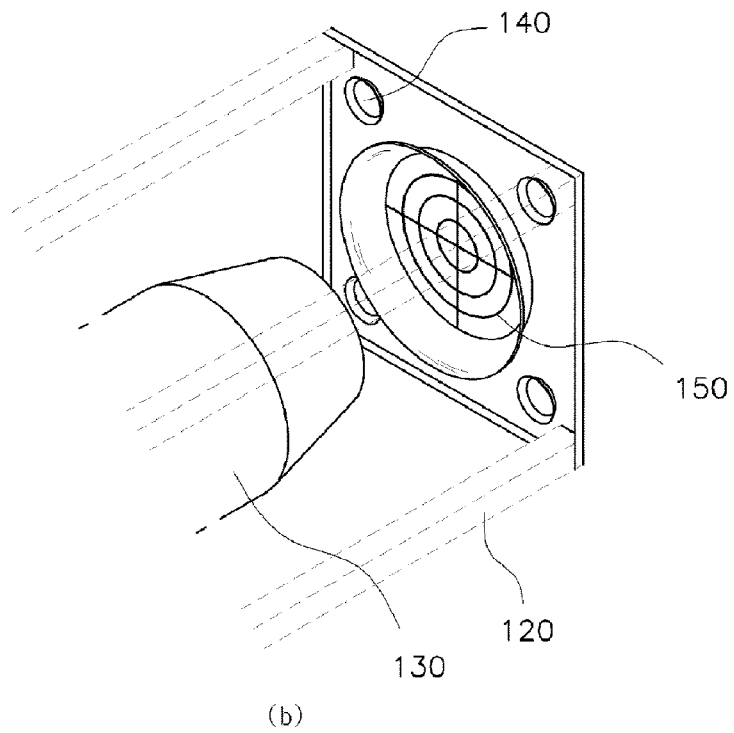

Further, FIG. 4 is a view illustrating an air supply fan in the integrated basement ventilation apparatus of the present invention, where (a) of FIG. 4 is a front view and (b) of FIG. 4 is a perspective view of main parts.

Figure 5:
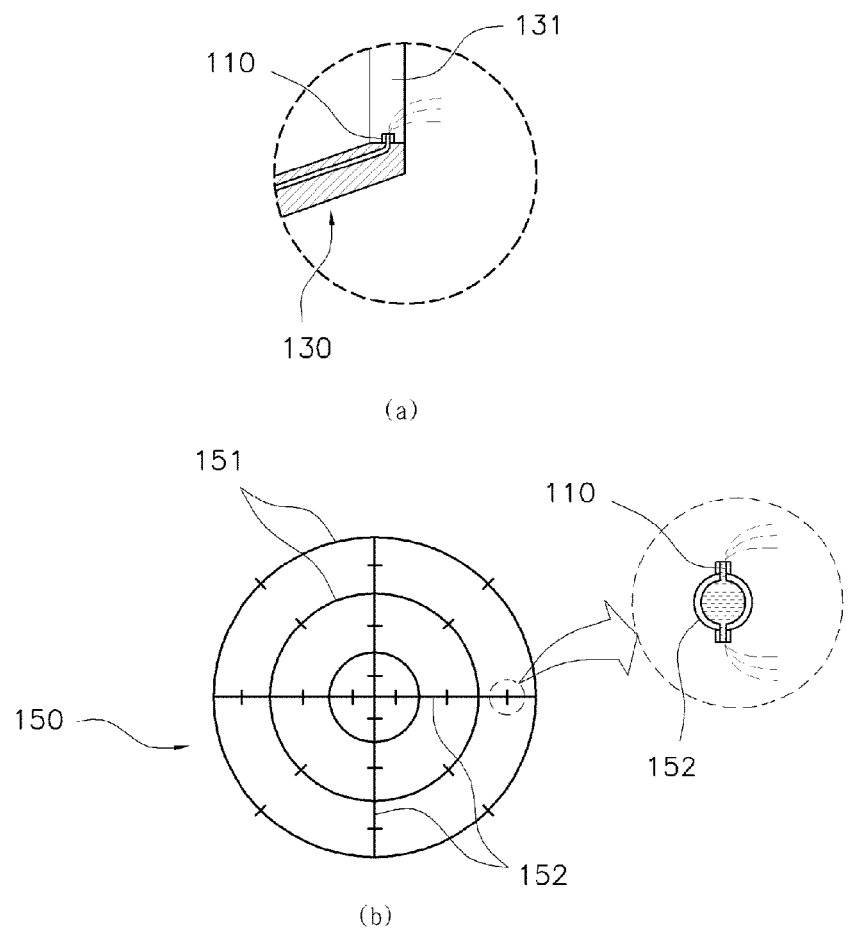
FIG. 5 is a view illustrating an example of installation of spray nozzles in the integrated basement ventilation apparatus of the present invention.
Figure 6:
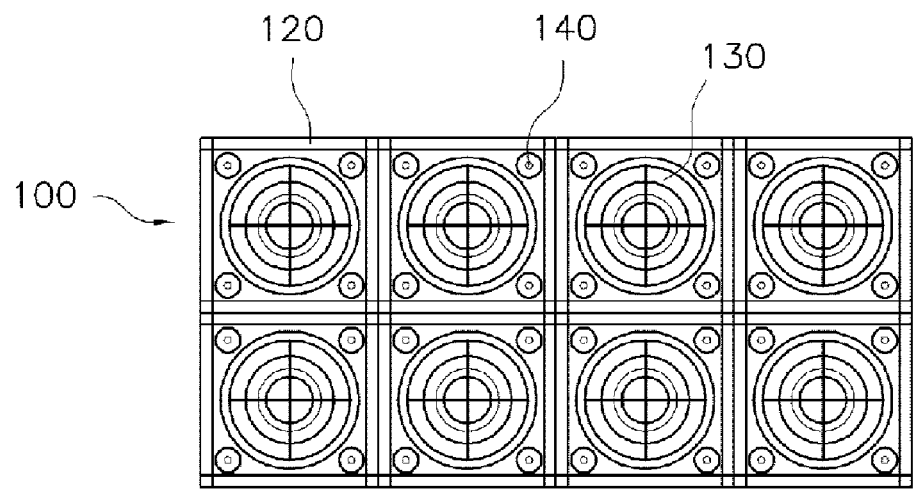
FIG. 6 is a view illustrating an example of installation of the air supply fan in the integrated basement ventilation apparatus of the present invention.

FIG. 5 is a view illustrating an example of installation of spray nozzle in the integrated basement ventilation apparatus of the present invention, where (a) of FIG. 5 illustrates the spray nozzle provided at a discharge port of the fan and (b) of FIG. 5 illustrates the spray nozzle provided at a filtering net of a frame, and FIG. 6 is a view illustrating an example of installation of the air supply fan in the integrated basement ventilation apparatus of the present invention.

Figure 7:
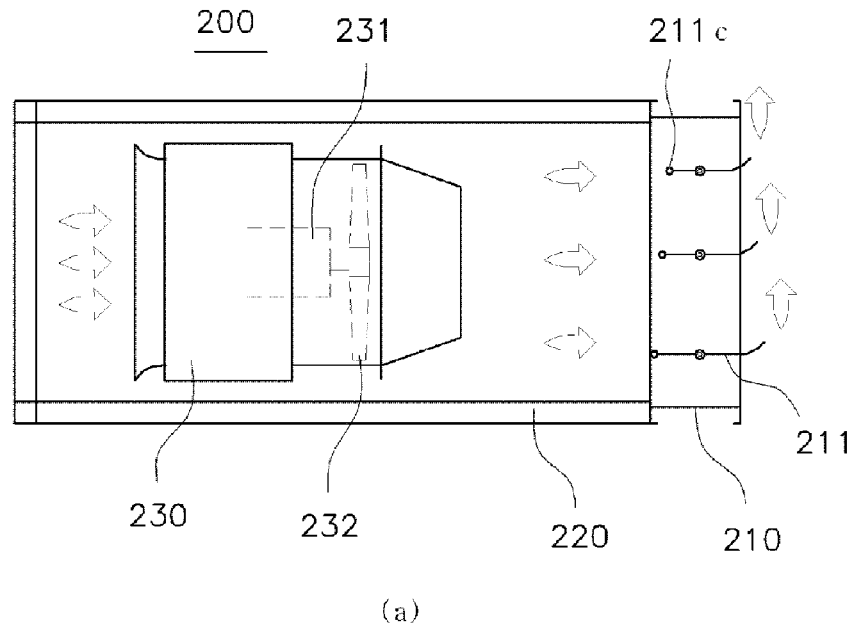
FIG. 7 is a view illustrating an air exhaust fan in the integrated basement ventilation apparatus of the present invention.
Figure 7:
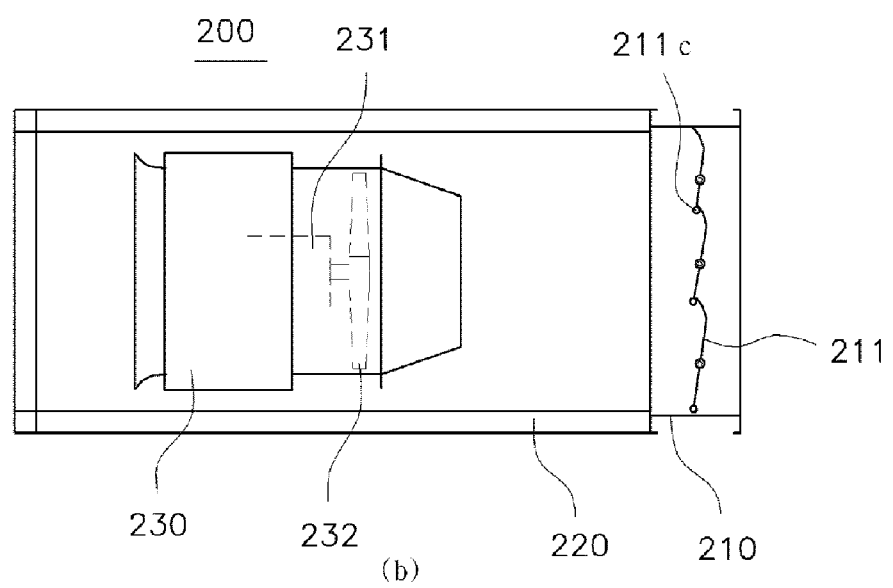

Furthermore, FIG. 7 is a view illustrating an air exhaust fan in the integrated basement ventilation apparatus of the present invention, where (a) of FIG. 7 illustrates a state that the fan operates and thus a fire-fighting damper is opened and (b) of FIG. 7 illustrates a state that the fan is stopped and thus the fire-fighting damper is closed.

Figure 8:
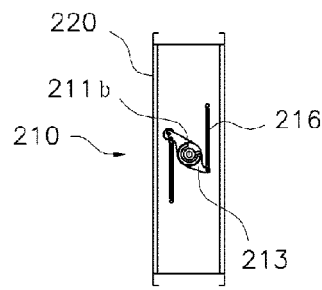
FIG. 8 is a view illustrating a fire-fighting damper in the integrated basement ventilation apparatus of the present invention.
Figure 8:
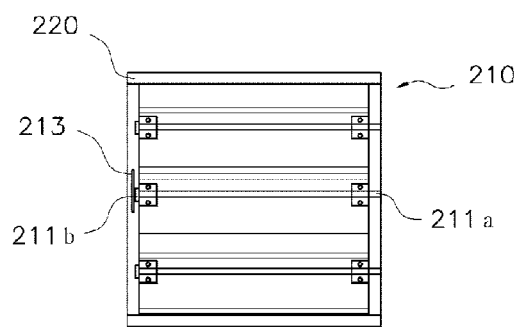
Figure 8:
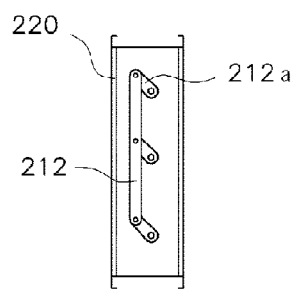

FIG. 8 is a view illustrating the fire-fighting damper in the integrated basement ventilation apparatus of the present invention, where (a) of FIG. 8 is a left side view, (b) of FIG. 8 is a front view and (c) of FIG. 8 is a right side view.

Figure 9:
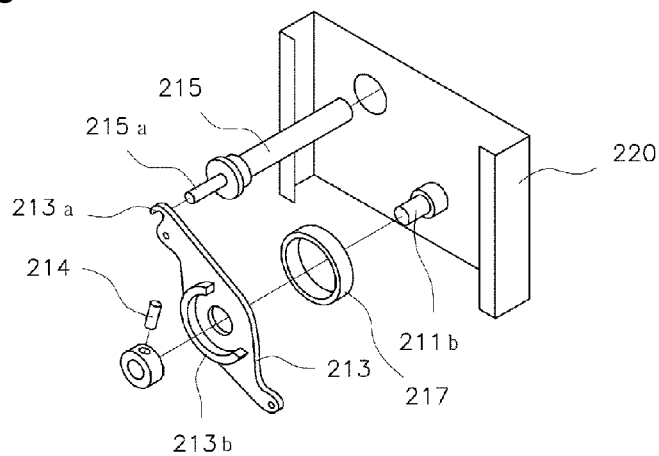
FIG. 9 is an exploded perspective view illustrating main parts of the fire-fighting damper in the integrated basement ventilation apparatus of the present invention.
Figure 10:
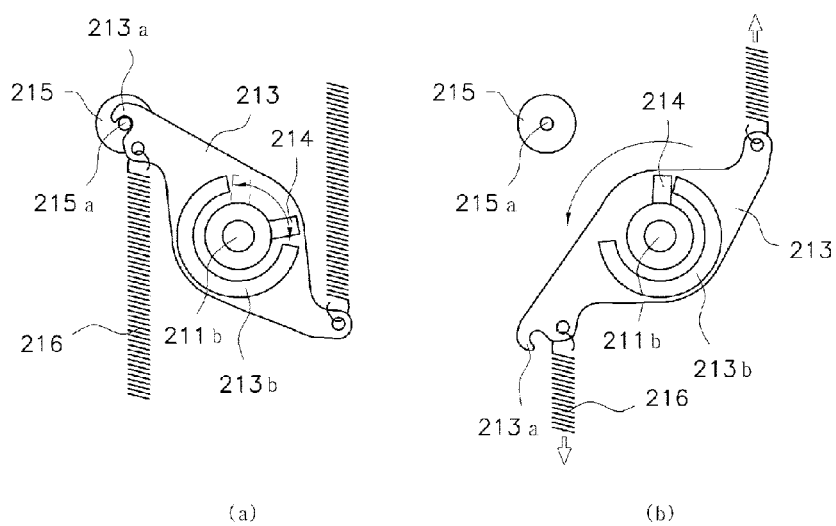
FIG. 10 is a view illustrating an example of operation of the fire-fighting damper in the integrated basement ventilation apparatus of the present invention.

FIG. 9 is an exploded perspective view illustrating main parts of the fire-fighting damper in the integrated basement ventilation apparatus of the present invention, FIG. 10 is a view illustrating an example of operation of the fire-fighting damper in the integrated basement ventilation apparatus of the present invention, where (a) of FIG. 10 illustrates a state that the fire-fighting damper can be usually opened or closed depending on whether the fan operates or not and (b) of FIG. 10 illustrates a state that the fire-fighting damper is forcedly closed in a case of outbreak of fire, regardless of whether the fan operates or not.

Figure 11:
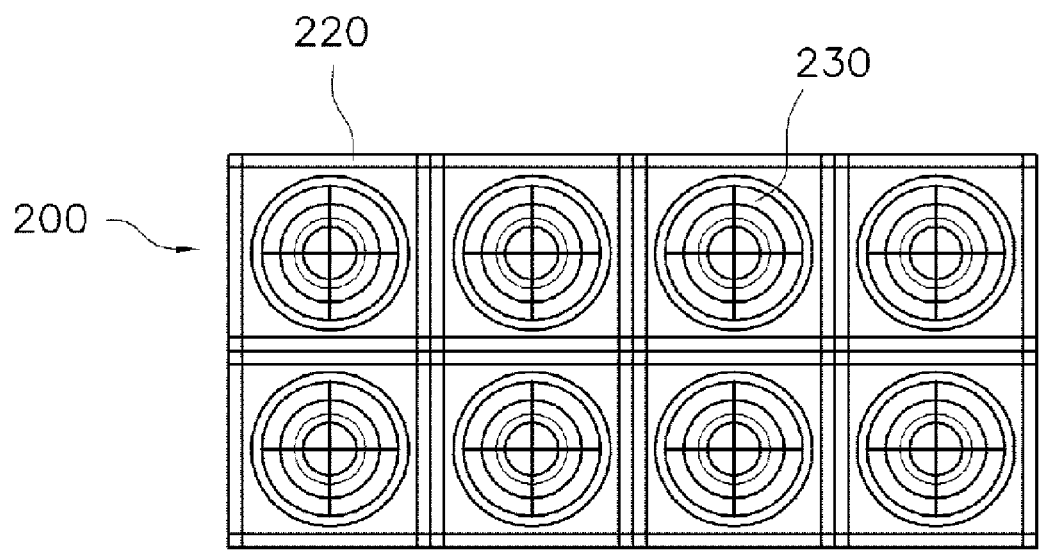
FIG. 11 is a view illustrating an example of installation of the air exhaust fan in the integrated basement ventilation apparatus of the present invention.
Figure 12:
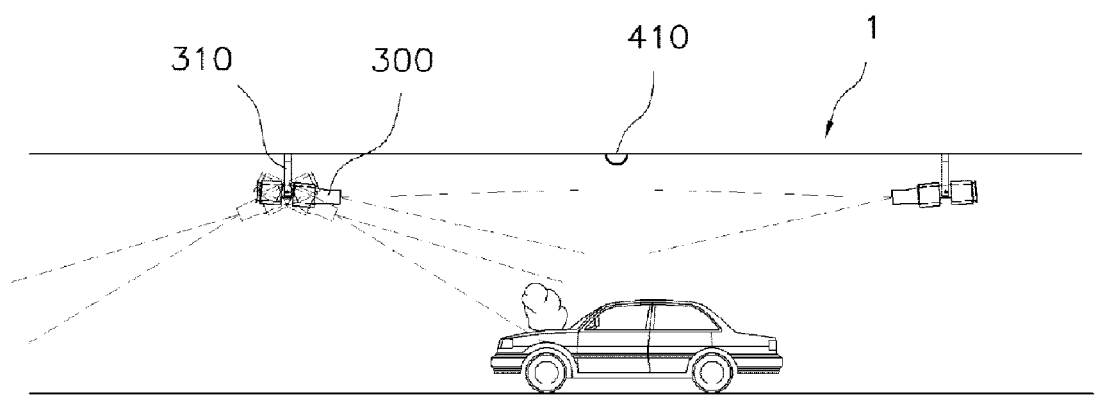
FIG. 12 is a view illustrating an example of operation of connecting fans in the integrated basement ventilation apparatus of the present invention in a case of outbreak of fire.

Finally, FIG. 11 is view illustrating an example of installation of the air exhaust fan in the integrated basement ventilation apparatus of the present invention, and FIG. 12 is a view illustrating an example of operation of connecting fans in the integrated basement ventilation apparatus of the present invention in a case of outbreak of fire.

The integrated basement ventilation apparatus of the present invention has primary technical features that it includes air supply fans (100), air exhaust fans (200), connecting fans (300) and a controller (not illustrated) connected to these fans in a wired or wireless manner, as illustrated in FIGS. 2 to 12 and that each air supply fan (100) is provided with a spray nozzle (110) and/or a fire-fighting damper (not illustrated) and thus has a fire-fighting function and a cooling effect obtained by finely spraying water along blown air and each air exhaust fan (200) is provided with a fire-fighting damper (210) to prevent the spread of fire in a case of outbreak of fire and that each connecting fan (300) is provided with a spray nozzle (not illustrated) and/or aim angle-adjusting means (310) controllable bi-axially and thus is capable of adjusting a blowing direction and that in particular, the controller generally controls the air supply fans (100), air exhaust fans (200) and connecting fans (300) depending on a condition detected by sensors (410) to smoothly perform the integrated ventilation for the basement structure (1).

In the following, an exemplary embodiment of the present invention will be described in detail with reference to the attached drawings.

The integrated basement ventilation apparatus of the present invention includes an air supply fan (100) installed in an air supply inlet of each floor along an air supply shaft (10) of the basement structure (1); an air exhaust fan (200) installed in an air exhaust outlet in each floor while facing an air exhaust shaft (20) of the basement structure (1); a plurality of connecting fans (300) supported on a ceiling of each floor of the basement structure (1) to form a plurality of air flow paths from the air supply fan (100) to the air exhaust fan (200); and a controller receiving electrical signals from the sensors (410) evenly distributed in the ceiling of each floor of the basement structure (1) for generally controlling the air supply fan (100), the air exhaust fan (200) and the plurality of connecting fans (300).

First, in the basement structure (1) formed in the basement of apartment or high-rise building, the air supply shaft (10) for supplying of air and the air exhaust shaft (20) for exhausting of air are each vertically formed as illustrated in FIGS. 2 and 3. Thus, external fresh air is supplied through the air supply shaft (10) and polluted air is exhausted through the air exhaust shaft (20).

In this connection, an air supply inlet is formed in each floor in the air supply shaft (10), and the air is supplied from the air supply shaft (10) through the air supply inlet to an internal space of the basement structure (1). The air supply inlet is provided with the air supply fan (100) to perform a forced air supply.

The air supply fan (100) includes a cylindrical fan (130) supported in an approximately rectangular column-shaped frame (120) as illustrated in FIG. 4, wherein the fan (130) has a rotatable blade (132) rotated by a motor (131) whose rotational speed can be controlled depending on the supply of electrical power.

In particular, the present invention is characterized in that it includes spray nozzles (110) that suck in water by means of negative pressure generated due to the air blowing to finely spray the water.

That is, in the present invention, a plurality of the spray nozzles (110) are provided radially equidistantly spaced from each other along a periphery of a discharge port (131) of the cylindrical fan (130) as illustrated in FIGS. 4(a) and 5(a), and preferably a water supply pipe is connected to each spray nozzle (110).

Thus, the plurality of spray nozzles (110) provided along the periphery of the discharge port (131) and directed inwards spray the water in the form of fine particles.

Similarly, in the present invention, a plurality of the spray nozzles (110) are provided in a filtering net (150) consisting of a plurality of concentric circle-shaped pipes (151) and cross-shaped pipes (152) as illustrated in FIGS. 4(b) and 5(b), and a water supply pipe may be connected to each spray nozzle (110).

Thus, the plurality of spray nozzles (110) spray the water in the form of fine particles from the filtering net (150) positioned in front of a frame (120) of the air supply fan (100).

In the present invention, any one of the above-described two types of the spray nozzles (110) may be selected and applied to the air supply fan (100), however, it is preferable that the later mentioned type of the spray nozzle (110) is applied to the connecting fan (300) described below.

According to the above-described configuration, the water is suctioned basically proportional to an air flow rate and sprayed in the form of fine particles without the use of a separate drive. The water thus sprayed lowers a temperature of the injected supplied air by means of latent heat of vaporization, thereby achieving an adiabatic cooling.

Thereby, the adiabatic cooling of the basement structure (1) can be carried out with no need to construct a separate cooling cycle, and thus a great economical advantage is obtained in ventilating the basement structure (1).

Secondarily, particles of the water sprayed in the form of fine particles as described above adhere to foreign matter such as dust and then descend together with it, thereby also having a function of filtering the foreign matter.

In addition, the supplied air containing the sprayed water may be also used for early fire suppression.

Further, the water supply pipe connected to the spray nozzle (110) may be controlled not to carry out the above-mentioned adiabatic cooling if necessary, for example, when the temperature of external air is lowered.

Further, interior air of the basement structure (1) may be kept more pleasant by additionally providing anion generators (140) toward the discharge port (131) of the air supply fan (100) as illustrated in FIG. 4 to generate anions when the air is supplied.

Such anion generators (140) are preferably positioned adjacent corners as illustrated in the figure so that the anions are naturally mixed with the supplied air by the blowing.

In this connection, it is preferable to construct the air supply fan (100) by horizontally and vertically stacking a plurality of small-capacity fans, rather than by a single large-capacity fan. For example, it is also possible to construct the air supply fan by horizontally and vertically stacking the plurality of small-capacity fans in four columns and two rows, as illustrated in FIG. 6.

Next, an air exhaust outlet is formed in each floor in the air exhaust shaft (20), and the air is exhausted from the internal space of the basement structure (1) through the air exhaust outlet to the air exhaust shaft (20). The air exhaust fan (200) is provided in such an air exhaust outlet to carry out a forced exhaust.

In this connection, guiding fans (500) may be additionally provided in the air exhaust shaft (20) between the floors to make the flow of the exhaust air more smooth, as illustrated in FIG. 2.

The air exhaust fan (200) also has a cylindrical fan (230) disposed in an approximately rectangular column-shaped frame (220) as illustrated in FIG. 7, wherein the fan (230) has a rotatable blade (232) rotated by a motor (231) whose rotational speed can be controlled depending on the supply of electrical power, as is the case with the air supply fan (100).

In particular, the present invention is further characterized in that the air exhaust fan (200 includes the fire-fighting damper (210) which is opened or closed depending on whether the fan operates or not and which can be forcedly closed through a temperature-dependently operated fuse (215).

That is, in the present invention, as illustrated in FIGS. 7 to 10, the fire-fighting damper (210) preferably includes a plurality of blades (211) horizontally arranged in multiple stages, each of which has opposite rotation shafts (211a, 211b) penetrating the frame (220) and rotatably supported thereby and is provided with a weight (211c); a connecting link (212) which integrally connects link arms (212a) each fixed to one side of corresponding one of a plurality of the rotation shafts (211a) and keeps degrees of opening of the plurality of blades (211) the same; a lock plate (213) which is rotatably supported on other side of any one of a plurality of the rotation shafts (211b) and has a catch hook (213a) formed at one side of the lock plate and an angle control ring (213b) of ring shape formed over a predetermined circumferential section; a catch element (214) which is fixed to an end of the rotation shaft (211b) supporting the lock plate (213) and is rotated integrally with the shaft and which protrudes in a normal direction, corresponding to the angle control ring (213b); a fuse (215) which engages the catch hook (213a) of the lock plate (213) to restrain the rotation of the lock plate (213) while remaining in a solid state below a predetermined temperature and which is molten to allow the rotation of the lock plate (213) when the predetermined temperature is exceeded; and elastic elements (216) for resiliently rotating the lock plate (213).

Firstly, the blades (211) define a wall when vertically oriented as illustrated in FIG. 7(b) and define a flat plate-like wing allowing the flow of air when horizontally oriented.

In this connection, the rotation shafts (211a, 211b) are protrudingly formed on both sides of each blade (211), respectively, as illustrated in FIG. 8, and are rotatably supported by the frame (220).

Further, each blade (211) is provided with the weight (211c) as illustrated in FIG. 7 and thus is kept vertically oriented by the weight (211c) when a separate external force is not applied, as illustrated in FIG. 7(b), and is automatically opened by the flow of air when the blowing is performed, as illustrated in FIG. 7(a).

In particular, the blades (211) are directional, and thus are opened only when the air is blown from the air exhaust fan (200) in a forward direction (i.e., from left to right in FIG. 7) and are not opened when the air is blown from the air exhaust shaft (20) in a rearward direction (i.e., from right to left in FIG. 7).

In this connection, the link arms (212a) are fixed to the rotation shafts (211a) of the blades (211), respectively and rotated integrally with the rotation shafts, as illustrated in FIG. 8(c). A plurality of such link arms (212a) are rotatably connected with a single connecting link (212) vertically positioned and thus the plurality of blades (211) are all rotated by the same angle.

Further, the lock plate (213) having the catch hook (213a) formed therein is rotatably supported on the rotation shaft (211b) of the blade (211), as illustrated in FIG. 8(a), FIG. 9 and FIG. 10.

The lock plate (213) is of approximately disk shape and the angle control ring (213b) is integrally formed on one side of the lock plate.

The angle control ring (213b) is in the form of a partially cut ring as illustrated in FIGS. 9 and 10, wherein a section of approximately 90 degrees is cut away; in other words, the angle control ring consists of a closed section of approximately 270 degrees and an open section of approximately 90 degrees.

The catch element (214) is positioned within the open section of such an angle control ring (213b) to limit the angle of rotation of the ring.

Further, the catch element (214) is fixedly fastened to an end of the rotation shaft (211b) of the blade (211) and the catch element (214) is integrally rotated with the rotation shaft (211b). The catch element (214) protrudes in a normal direction with respect to the rotation shaft (211b) and is positioned within the open section of the angle control ring (213b).

In this connection, reference numeral "217" designates a bearing in FIG. 9, a bush (not illustrated) etc. may be additionally provided, if necessary.

Further, the fuse (215) is fixed to the frame (220) and engages the catch hook (213a) of the lock plate (213) to selectively restrain the rotation of the lock plate (213).

Such a fuse (215) internally contains metal having a relatively low melting point such as lead etc.

In this connection, when a predetermined temperature has been exceeded in a case of outbreak of fire, a fuse end (215a) axially moves inwards, thereby allowing the rotation of the lock plate (213).

Finally, the lock plate (213) is supported so that it can be resiliently rotated in a counterclockwise direction in FIG. 10 by two or more elastic elements (216), such as coil springs, supported on the frame (220). When the fuse end (215a) of the fuse (215) inwardly moves from such a state as in FIG. 10(a) due to an influence of high temperature, the lock plate (213) is resiliently rotated in the counterclockwise direction as illustrated in FIG. 10(b).

According to such a configuration, in the fire-fighting damper (210), the catch element (214) is usually positioned within the open section of the angle control ring (213b) of the lock plate (213), thereby allowing the rotation of the blade (211) in the range of approximately 90 degrees, as illustrated in FIG. 10(a).

Therefore, when the air exhaust fan (200) operates, the plurality of blades (211) are horizontally opened by the blowing as illustrated in FIG. 7(a) and thus the air is exhausted. Meanwhile, when the air exhaust fan (200) is stopped, the plurality of blades are vertically closed by means of the weights (211c) as illustrated in FIG. 7(b).

Thereby, when the air exhaust fan (200) operates, the blades are opened, and when the air exhaust fan (200) is stopped, the blades are closed and thus prevent backflow of polluted air from the air supply shaft (20) to the room.

Then, in a case of outbreak of fire, the fuse end (215a) of the fuse (215) moves inwards and thus the lock plate (213) engaging the fuse end (215a) at the catch hook (213a) is rotated in the counterclockwise direction by the elastic elements (216) as illustrated in FIG. 10(b) and at the same time the angle control ring (213b) is also rotated together.

As a result, the catch element (214) positioned within the open section of the angle control ring (213b) is forcedly rotated in the counterclockwise direction by the closed section, thereby forcibly rotating the blade (211) through the rotation shaft (211b) to which the catch element (214) is fixed, and thus all of the blades (211) are vertically oriented, thereby forming a fire-fighting wall as illustrated in FIG. 7(b).

Therefore, when the fire breaks out, the fire can prevented from spreading to another floor by the fact that the plurality of blades (211) form the fire-fighting wall.

In such a case, the elastic coefficient of the elastic elements (216) is very high, and therefore the blades (211) are not opened even if the air exhaust fan (200) blows the air.

Although not illustrated, it is also possible to additionally provide the air supply fan (100) with the above-described fire-fighting damper (210) if necessary, thereby preventing heat resulting from the fire breaking out in another floor from coming into the room along with the supplied air.

In addition, the blades (211) are bent at an end portion opposite to the weight (211c) as illustrated in FIG. 7 and thus deflect a horizontal flow of air upwards, and it is most preferable that the blades (211) are gradually longer as they are disposed closer to a bottom of the frame (220).

Thereby, when the blades (211) are kept horizontal by the blowing of the air exhaust fan (200), advantageously the exhaust air flows along the bent blades (211) and then is naturally directed upwards in the air exhaust shaft (20) even without separate vanes.

Further, by making the blades (211) gradually longer from top to bottom, the exhaust air can flow more smoothly since positions at which the flow of exhaust air is deflected after taking the blades (211) vary depending on levels of the blades.

As mentioned above, it is preferable that the bent blades (211) are applied only to the air exhaust fan (200), and blades (not illustrated) provided to the air supply fan (100) are advantageously straight in section.

In this connection, it is preferable to construct the air exhaust fan (200) by horizontally and vertically stacking a plurality of small-capacity fans, rather than by a single large-capacity fan, as is the case with the air supply fan (100) described above. For example, it is also possible to construct the air exhaust fan by horizontally and vertically stacking the plurality of small-capacity fans in four columns and two rows, as illustrated in FIG. 11.

Next, the connecting fans (300) are supported on a ceiling of each floor of the basement structure (1) without the use of separate frames as illustrated FIGS. 2 and 12, and form a plurality of air flow paths from the air supply fan (100) to the air exhaust fan (200) as illustrated in FIG. 3.

In particular, the aim angle-adjusting means (310) for supporting the connecting fan (300) on the ceiling can rotate the connecting fan (300) 360 degrees as illustrated in FIG. 12 and at the same time is controllable with respect to two or more axes so that upward/downward aim angle of the connecting fan can be adjusted, and thus can variously change a blowing direction.

Although not illustrated, the above-described spray nozzle may be applied to the connecting fan (300).

Finally, the controller (not illustrated) is connected to the above-described air supply fan (100), air exhaust fan (200) and connecting fan (300), respectively, in a wired or wireless manner, and at the same time also is connected to the sensors (410) disposed on the ceiling of each floor of the basement structure (1) while evenly distributed, as illustrated in FIGS. 2 and 3.

The sensors (410) can complexly detect at least one of a temperature, humidity, concentration of harmful gas and amount of fine dust from the air of the basement structure (1) and transmits a detected value as electrical signal to the controller.

Thereby, the controller can basically operate the air supply fan (100), the connecting fan (300) and the air exhaust fan (200) to detect the polluted air in the basement structure (1) by itself and carry out a forced ventilation. In particular, for a local pollution in the basement structure (1) detected by the sensors (410), the controller can control nearby connecting fans (300) on a relevant air flow path to operate in association with the air supply fan, the connecting fan and the air exhaust fan.

Thereby, the controller (400) can keep the temperature, humidity, concentration of harmful gas and amount of fine dust in the entire or local area of the basement structure (1) below a set reference value.

Hereinafter, referring to FIGS. 2 to 12, the operation of the present invention will be described as follows.

In the integrated basement ventilation apparatus of the present invention configured as above, the controller checks the quality of interior air by the sensors (410) evenly distributed in the basement structure (1) as illustrated in FIGS. 2 and 3.

If a full ventilation is required for the inside of the basement structure (1), all of the air supply fan (100), connecting fan (300) and air exhaust fan (200) are operated to form a plurality of air flow paths in the basement structure (1), whereby the full ventilation is achieved.

In contrast, if a local ventilation is required for the inside of the basement structure (1), only the connecting fans (300) near a pollution-detected area may be selectively operated together with the operations of the air supply fan (100) and air exhaust fan (200) to form a certain air flow path, thereby carrying out the ventilation.

In addition, an amount of blowing may be controlled to be increased or decreased depending on a detected degree of pollution of interior air.

Further, the air supply fan (100) is provided with the spray nozzles (110) and the anion generators (140). The spray nozzle (110) sprays the water in the form of fine particles depending on the supply of air to achieve the adiabatic cooling by means of latent heat of vaporization. Therefore, hot external air is prevented from directly flowing into the basement structure (1) in an area of high-temperature or in the summer, without constructing a separate cooling cycle, and additionally, the fine particles of the water adhere to the foreign matter and descend together with it.

Further, the anions can be incorporated into the supplied air by the anion generators (140) provided in the air supply fan (100), whereby the inside of the basement structure (1) can be kept more pleasant.

Further, although not illustrated, a fire-fighting function may be provided by adding a fire-fighting damper to the air supply fan (100).

In addition, the air exhaust fan (200) is provided with the fire-fighting damper (210). The fire-fighting damper is usually automatically opened by the blowing of exhaust air. When the air exhaust fan (200) does not operate, the fire-fighting damper is closed by the weights (211c), thereby preventing backflow of the polluted air from the air exhaust shaft (20).

In particular, when the fire breaks out, the fire-fighting damper (210) is forcedly closed through the fuse (215), thereby preventing the spread of fire to other floors without the use of a separate electrical source.

By applying such a fire-fighting damper to the air supply fan (100), the fire can be also prevented from spreading to a relevant floor.

Further, in the present invention, the plurality of connecting fans (300) are installed on the ceiling of the basement structure (1) through the aim angle-adjusting means (310) controllable with respect to two or more axes and at the same time the plurality of sensors (410) are evenly distributed. Therefore, when a local air pollution occurs, the connecting fans (300) are operated so as to cover a relevant area without a need to run the whole ventilation apparatus, whereby the polluted interior air can be discharged to the outside only by means of a specific air flow path.

In addition, each connecting fan (300) is also provided with spray nozzles (not illustrated) and thus the water can be additionally supplied in the form of fine particles to the air flow path.

In particular, when the fire breaks out in the basement structure (1) as illustrated in FIG. 12, the sensor (410) detects the outbreak of fire and controls the aim angle-adjusting means (310) so as to aim the nearby connecting fan (300) at a relevant area, and the air containing a lot of moistures is supplied through the spray nozzles (110) provided in the air supply fan (100), and thereafter, the connecting fan (300) provided with the spray nozzles are additionally controlled to be directed to the area in which the fire breaks out, whereby an effect is obtained that the fire can be suppressed early.

INDUSTRIAL APPLICABILITY

Therefore, the integrated basement ventilation apparatus of the present invention has the following outstanding advantages.

First, when the air is supplied, the adiabatic cooling is carried out by means of latent heat of vaporization through the spray nozzles (110) of the air supply fan (100) and/or spray nozzles of the connecting fans (300), and thus an increase in internal temperature of the basement structure can be prevented at a low cost in an area of high-temperature or in the summer, without constructing or operating a separate cooling cycle, and an effect of removal of foreign matter is also obtained.

Second, the air exhaust fan (200) and/or air supply fan (100) is provided with the fire-fighting damper, and the damper is opened or closed by itself depending on whether the air supply fan (100) and/or the air exhaust fan (200) operates or not, thereby preventing the backflow of air, and when the fire breaks out, the damper is forcedly closed to prevent the spread of fire to another floor, thereby enhancing a fire safety.

Third, a general automatic control is possible depending on a local air condition in the basement structure, and therefore, when a full or local pollution occurs in the basement structure (1), a local ventilation for a relevant area is possible and thus, contrary to prior art, the whole system does not need to be operated, and particularly, early fire suppression is possible and the quality of air in the basement structure is significantly enhanced, therefore, condition and maintenance of whole facilities can be significantly enhanced.

What is claimed is:

1. An integrated basement ventilation apparatus comprising:
    an air supply fan installed, along an air supply duct of a basement structure having a plurality of floors, in an air supply inlet of each floor of the basement structure;
    an air exhaust fan installed in an air exhaust outlet of each floor of the basement structure while facing an air exhaust duct of the basement structure; and
    a plurality of connecting fans supported on a ceiling of each floor of the basement structure to form a plurality of air flow paths from the air supply fan to the air exhaust fan,
    wherein at least one of the air supply fan and the air exhaust fan is additionally provided with a plurality of spray nozzles which suck in water by means of negative pressure generated due to air blowing to finely spray the water,
    wherein the plurality of spray nozzles are provided radially equidistantly spaced from each other along a periphery of a discharge port of the at least one of the air supply fan and the air exhaust fan, and a water supply pipe is connected to each spray nozzle.

2. The integrated basement ventilation apparatus according to claim 1, wherein the air supply fan and the air exhaust fan includes a cylindrical fan supported in a polygonal column-shaped frame.

3. The integrated basement ventilation apparatus according to claim 2, wherein the at least one of the air supply fan and the air exhaust fan is additionally provided with a fire-fighting damper which is opened or closed depending on an operation of the at least one of the air supply fan and the air exhaust fan and which is able to be forcedly closed by a temperature-dependently operated fuse.

4. The integrated basement ventilation apparatus according to claim 1, wherein the connecting fans are supported on the ceiling of the basement structure through aim angle-adjusting means controllable with respect to two or more axes.

5. An integrated basement ventilation apparatus comprising:
    an air supply fan installed, along an air supply duct of a basement structure having a plurality of floors, in an air supply inlet of each floor of the basement structure;
    an air exhaust fan installed in an air exhaust outlet of each floor of the basement structure while facing an air exhaust duct of the basement structure; and
    a plurality of connecting fans supported on a ceiling of each floor of the basement structure to form a plurality of air flow paths from the air supply fan to the air exhaust fan,
    wherein at least one of the air supply fan and the air exhaust fan is additionally provided with a plurality of spray nozzles which suck in water by means of negative pressure generated due to air blowing to finely spray the water,
    wherein the at least one of the air supply fan and the air exhaust fan includes a filtering net disposed to face a discharge port of the at least one of the air supply fan and the air exhaust fan, the filtering net including a plurality of concentric circle-shaped pipes, and linear connecting pipes intersecting each other at a center of the plurality of concentric circle-shaped pipes and connecting the plurality of concentric circle-shaped pipes with each other, and wherein the plurality of spray nozzles are provided on the plurality of concentric circle-shaped pipes and the linear connecting pipes, and a water supply pipe is connected to each spray nozzle.

6. The integrated basement ventilation apparatus according to claim 1, wherein the air supply fan is additionally provided with anion generators, and supplied air is mixed with anions.

7. An integrated basement ventilation apparatus comprising:

an air supply fan installed, along an air supply duct of a basement structure having a plurality of floors, in an air supply inlet of each floor of the basement structure;

an air exhaust fan installed in an air exhaust outlet of each floor of the basement structure while facing an air exhaust duct of the basement structure; and a plurality of connecting fans supported on a ceiling of each floor of the basement structure to form a plurality of air flow paths from the air supply fan to the air exhaust fan, wherein the at least one of the air supply fan and the air exhaust fan is additionally provided with a fire-fighting damper which is opened or closed depending on an operation of the at least one of the air supply fan and the air exhaust fan and which is able to be forcedly closed by a temperature-dependently operated fuse, wherein the fire-fighting damper comprises:

a plurality of blades horizontally arranged in multiple stages, each of which has an rotation shaft penetrating a frame of the fire-fighting damper and rotatably supported by the frame and is provided with a weight;

a connecting link which integrally connects link arms each fixed to one side of the rotation shaft of each blade and keeps degrees of opening of the plurality of blades the same;

a lock plate which is rotatably supported on other side of any one of a plurality of rotation shafts of the plurality of blades and has a catch hook formed at one side of the lock plate and an angle control ring of ring shape formed over a predetermined circumferential section;

a catch element which is fixed to an end of the rotation shaft supporting the lock plate and is rotated integrally with the rotation shaft supporting the lock plate and which protrudes in a normal direction, corresponding to the angle control ring;

a fuse which engages the catch hook of the lock plate to restrain a rotation of the lock plate while remaining in a solid state below a predetermined temperature and which is molten to allow the rotation of the lock plate when the predetermined temperature is exceeded; and elastic elements for resiliently rotating the lock plate.

8. The integrated basement ventilation apparatus according to claim 7, wherein the plurality of blades are bent at an end portion opposite to the weight and thus deflect a horizontal flow of air upwards, and the plurality of blades are gradually longer as they are disposed closer to a bottom of the frame.

* * * * *